United States Patent
Lee et al.

(10) Patent No.: US 11,063,803 B2
(45) Date of Patent: *Jul. 13, 2021

(54) RANDOM ACCESS PPDU FOR WLAN SYSTEMS

(71) Applicant: ATLAS GLOBAL TECHNOLOGIES LLC, Austin, TX (US)

(72) Inventors: Daewon Lee, Irvine, CA (US); Sungho Moon, Irvine, CA (US); Ahmad Reza Hedayat, Aliso Viejo, CA (US); Yujin Noh, Irvine, CA (US)

(73) Assignee: Atlas Global Technologies LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,525

(22) Filed: Mar. 12, 2020

(65) Prior Publication Data
US 2020/0213172 A1 Jul. 2, 2020

Related U.S. Application Data

(63) Continuation of application No. 16/351,280, filed on Mar. 12, 2019, now Pat. No. 10,630,519, which is a
(Continued)

(51) Int. Cl.
*H04W 4/00* (2018.01)
*H04L 27/26* (2006.01)
(Continued)

(52) U.S. Cl.
CPC ........ *H04L 27/2613* (2013.01); *H04L 5/0016* (2013.01); *H04L 5/0023* (2013.01);
(Continued)

(58) Field of Classification Search
CPC ............ H04L 27/2613; H04L 27/0006; H04L 74/085; H04L 5/0016; H04L 5/0023; H04L 5/0094
(Continued)

(56) References Cited

U.S. PATENT DOCUMENTS

| 10,263,821 B2* | 4/2019 | Lee | ........................ H04L 5/0016 |
| 10,630,519 B2* | 4/2020 | Lee | ........................ H04L 5/0016 |

(Continued)

FOREIGN PATENT DOCUMENTS

| WO | WO 2015/194727 | 12/2015 |
| WO | WO 2016/126068 | 8/2016 |

(Continued)

OTHER PUBLICATIONS

Extended European Search Report from European Patent Application No. 16804358.6, dated Dec. 13, 2018, 11 pages.
(Continued)

*Primary Examiner* — Thai D Hoang
(74) *Attorney, Agent, or Firm* — Thomas J. Lavan

(57) ABSTRACT

In wireless communications for multi-users, an access point may transmit a first trigger frame to one or more stations. The first trigger frame may be for scheduling a first uplink multi-user transmission and may indicate a plurality of resources for indicating existence of data to be sent to the access point. The station(s) may process the first trigger frame received from the access point. In response to the first trigger frame, the station(s) may generate and transmit a respective first uplink frame to the access point. In some cases, the first uplink frame(s) from the station(s) does not have a data field and does have a signal indicating existence of data to be sent from the station(s) to the access point. The
(Continued)

signal may be sent using a resource(s) of the plurality of resources. Other methods, apparatus, and computer-readable media are also disclosed.

20 Claims, 17 Drawing Sheets

Related U.S. Application Data continuation of application No. 15/170,890, filed on Jun. 1, 2016, now Pat. No. 10,263,821.

(60) Provisional application No. 62/170,057, filed on Jun. 2, 2015.

(51) Int. Cl.
| | |
|---|---|
| *H04L 5/00* | (2006.01) |
| *H04L 27/00* | (2006.01) |
| *H04W 74/08* | (2009.01) |
| *H04W 84/12* | (2009.01) |
| *H04W 74/06* | (2009.01) |

(52) U.S. Cl.
CPC ........ *H04L 5/0094* (2013.01); *H04L 27/0006* (2013.01); *H04W 74/085* (2013.01); *H04W 74/06* (2013.01); *H04W 84/12* (2013.01)

(58) Field of Classification Search
USPC .................................. 370/328–330, 335–349
See application file for complete search history.

(56) References Cited

U.S. PATENT DOCUMENTS

| | | | |
|---|---|---|---|
| 2013/0286959 A1 | 10/2013 | Hanging et al. | |
| 2014/0247824 A1* | 9/2014 | Sohn, III | H04W 74/002 |
| | | | 370/338 |
| 2014/0369276 A1 | 12/2014 | Porat et al. | |
| 2015/0023335 A1* | 1/2015 | Vermani | H04B 7/0452 |
| | | | 370/338 |
| 2015/0173070 A1 | 6/2015 | Aboul-Magd et al. | |
| 2016/0100396 A1 | 4/2016 | Seok | |
| 2016/0119933 A1* | 4/2016 | Merlin | H04W 72/0453 |
| | | | 370/312 |
| 2016/0192351 A1 | 6/2016 | Kwon | |
| 2016/0278081 A1* | 9/2016 | Chun | H04L 5/0007 |
| 2016/0302185 A1* | 10/2016 | Sun | H04W 74/08 |
| 2017/0048048 A1 | 2/2017 | Seok | |
| 2018/0007712 A1* | 1/2018 | Lou | H04W 74/006 |
| 2018/0014334 A1 | 1/2018 | Woojin et al. | |

FOREIGN PATENT DOCUMENTS

| | | |
|---|---|---|
| WO | WO 2016/129979 | 8/2016 |
| WO | WO 2016/164912 | 10/2016 |

OTHER PUBLICATIONS

International Search Report and Written Opinion from PCT/US16/35330, dated Aug. 31, 2016, 16 pages.
LAN/MAN Standards Committee of the IEEE Computer Society, "IEEE P802.11ah™ /D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.
LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.
Chinese Office Action from Chinese Patent Application No. 201680038441.8, dated Aug. 21, 2020, 18 pages including English language translation.
Indian Office Action from Indian Patent Application No. 201717046600, dated Jun. 10, 2020, 7 pages.
European Office Action from European Patent Application No. 16804358.6, dated Mar. 3, 2020, 5 pages.

* cited by examiner $$P_{LTF} = \begin{bmatrix} 1 & -1 & 1 & 1 & 1 & 1 & 1 & 1 \\ 1 & 1 & -1 & 1 & 1 & -1 & 1 & 1 \\ 1 & 1 & 1 & -1 & 1 & 1 & -1 & 1 \\ -1 & 1 & 1 & 1 & -1 & 1 & 1 & -1 \end{bmatrix}$$

FIG. 9

RANDOM ACCESS PPDU FOR WLAN SYSTEMS

CROSS-REFERENCE TO RELATED APPLICATIONS

This application is a continuation application of application Ser. No. 16/351,280, filed on Mar. 12, 2019, which is a continuation application of application Ser. No. 15/170,890, filed on Jun. 1, 2016, now U.S. Pat. No. 10,263,821, which claims the benefit of U.S. Provisional Application No. 62/170,057, filed Jun. 2, 2015, the entirety of each of which is incorporated herein by reference.

TECHNICAL FIELD

The present description relates in general to wireless communication systems and methods, and more particularly to, for example, without limitation, random access physical layer convergence procedure (PLCP) protocol data unit (PPDU) for wireless local area network (WLAN) systems.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 9 illustrates an example of a mapping matrix PLTF.

Figure 1:
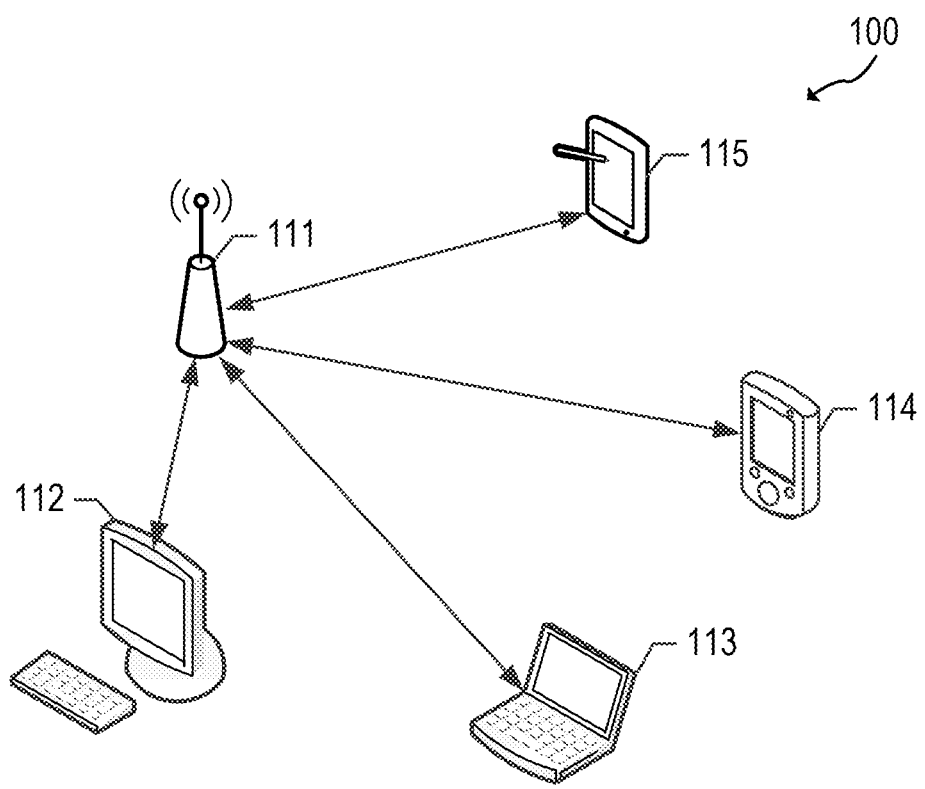
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Systems and methods are disclosed for facilitating uplink (UL) transmissions. One or more implementations of such systems and methods may facilitate random access for supporting (e.g., efficiently supporting) UL multi-user (MU) transmissions. The subject technology may be utilized in Institute of Electrical and Electronics Engineers (IEEE) systems, such as high efficiency (HE) WLAN.

A station may be allocated a random access channel for a specific time duration. In some aspects, the random access channel may be allocated for stations that have data (e.g., queued data) to send in the uplink. Each station that has some data to send may participate in random access and select a resource for use in random access transmission. In an aspect, during the random transmission process, collisions may occur between the random access transmissions from different stations. In such a case, resources (e.g., frequency resource, code resource) associated with (e.g., selected by, allocated to) the different stations may overlap. In another aspect, each station that may potentially participate in random access transmission may be associated with resources exclusive to (e.g., allocated only to) the station, such that collisions can be avoided. In such a case, random access may be referred to as deterministic random access.

In some aspects, random access physical layer convergence procedure (PLCP) protocol data unit (PPDU) design and transmission methods may be provided to facilitate efficient random access resource utilization. In an aspect, the random access PPDU may be referred to as a random access signal. In some cases, such PPDU design and transmission methods may help reduce or avoid collision between random access transmissions from different stations.

In one or more implementations, an access point (AP) may transmit a trigger frame to facilitate UL transmission (e.g., UL MU transmission). For instance, the AP may utilize the trigger frame to schedule a UL MU transmission. The trigger frame may be utilized to solicit response frames from one or more stations. For simultaneous response frames, the one or more stations may transmit their response frames using UL MU transmission technology, such as UL MU OFDMA and/or UL MU-MIMO.

A trigger frame may be a frame sent by an AP that seeks data, control, or management frame response(s) from stations that participate in a subsequent UL MU frame. The trigger frame may be utilized to initiate the simultaneous MU transmission in OFDMA. In an aspect, a trigger frame may include, for example, some or all of the following features: (a) a list of stations (STAs) that an AP seeks a response from; (b) resource allocation information for each STA (e.g., a subband(s) assigned to each STA); and/or (c) attributes of the expected UL MU frame, such as the duration, bandwidth, etc., among other features. A trigger frame may be used to allocate resource for UL MU transmission and to solicit an UL MU transmission from the participating stations in response to the trigger frame. The trigger frame may include other information needed by the participating stations, and the UL MU transmission may occur at a predetermined time interval after the trigger frame. In an aspect, the resource allocation information may include frequency allocation information and/or code allocation information. In an aspect, a code-frequency resource may include one or more resource unit(s) (e.g., a frequency subband(s)) and code to be utilized for transmission. In an aspect, the trigger frame may be referred to as an uplink trigger frame, since the trigger frame may be utilized for facilitating (e.g., triggering) UL transmission. In an aspect, the trigger frame may be utilized to solicit a null data packet (NDP) from each STA. The term "resource" may refer to, for example, a bandwidth (e.g., a subband(s), frequencies, frequency band(s)), code, time/duration that the STAs expect to occupy a transmission medium, and/or possibly a number of spatial streams that the STAs may use.

In one aspect, the AP may allocate different portions of a channel bandwidth to different stations. In one aspect, a portion of a channel bandwidth may be a resource unit. In another aspect, a portion of a channel bandwidth may be one or more resource units. In yet another aspect, a portion of a channel bandwidth may be one or more blocks of a channel bandwidth. In an aspect, the resource unit may be referred to as a frequency resource unit.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
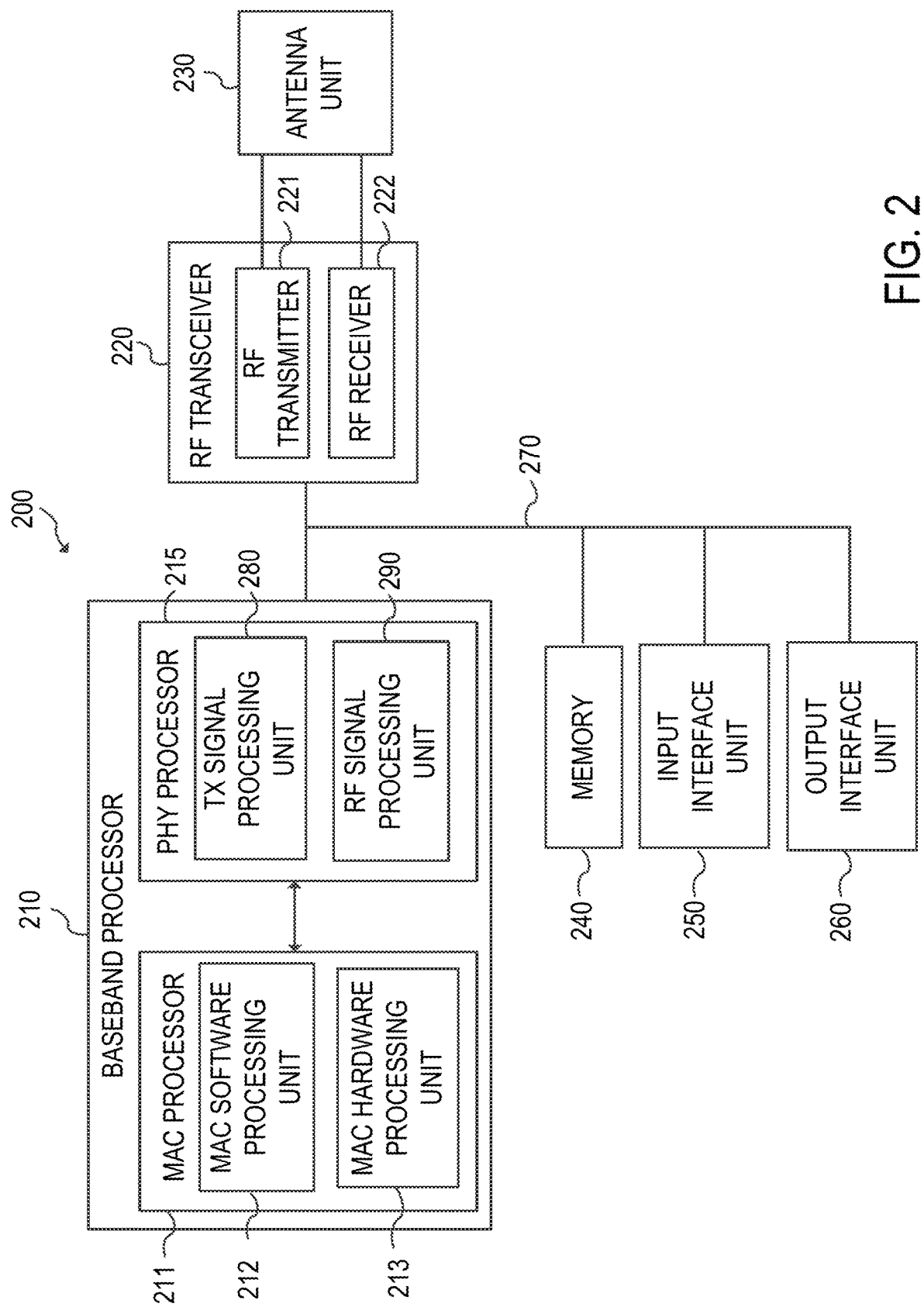
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
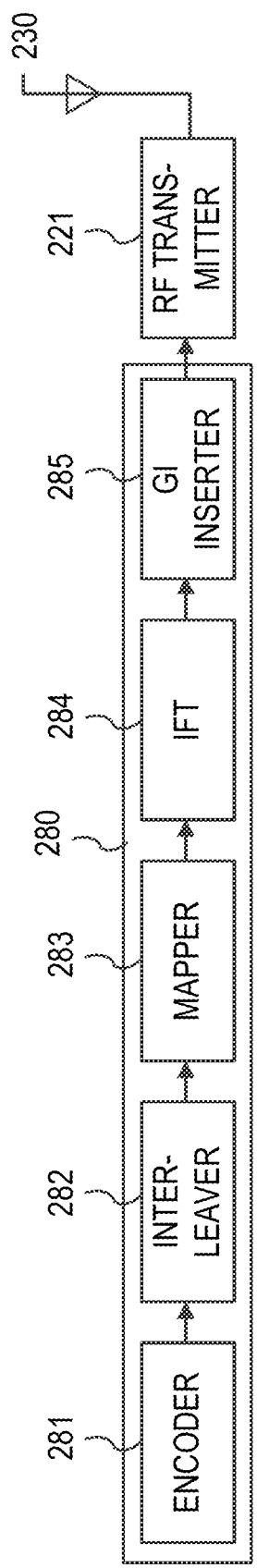
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
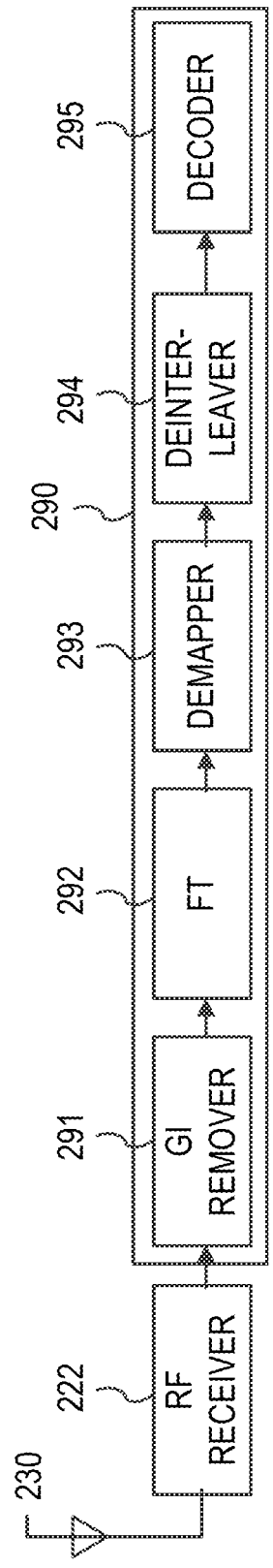
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
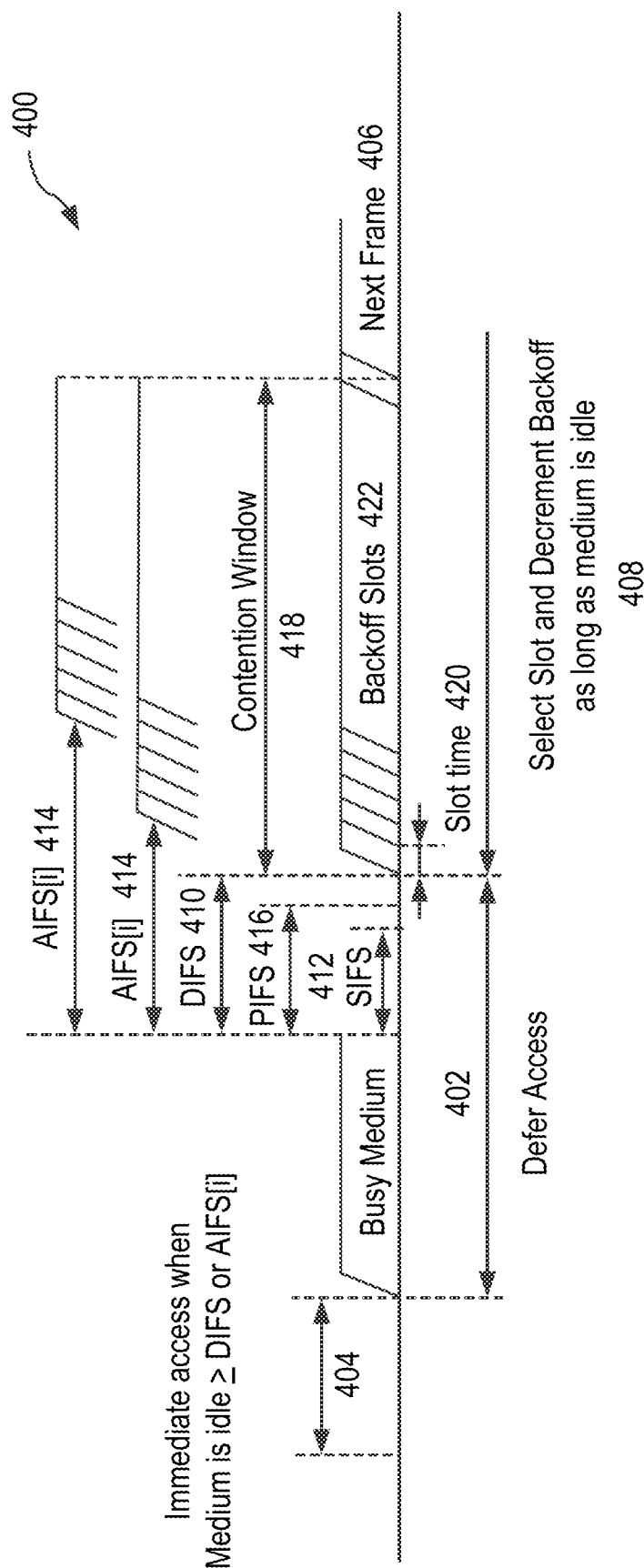
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
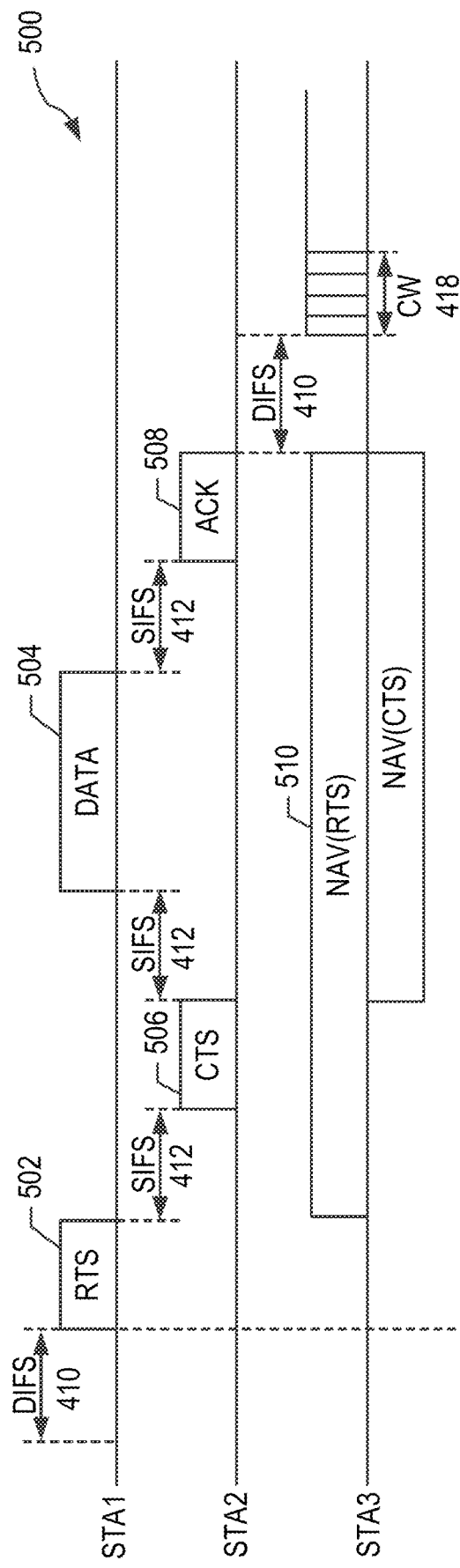
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
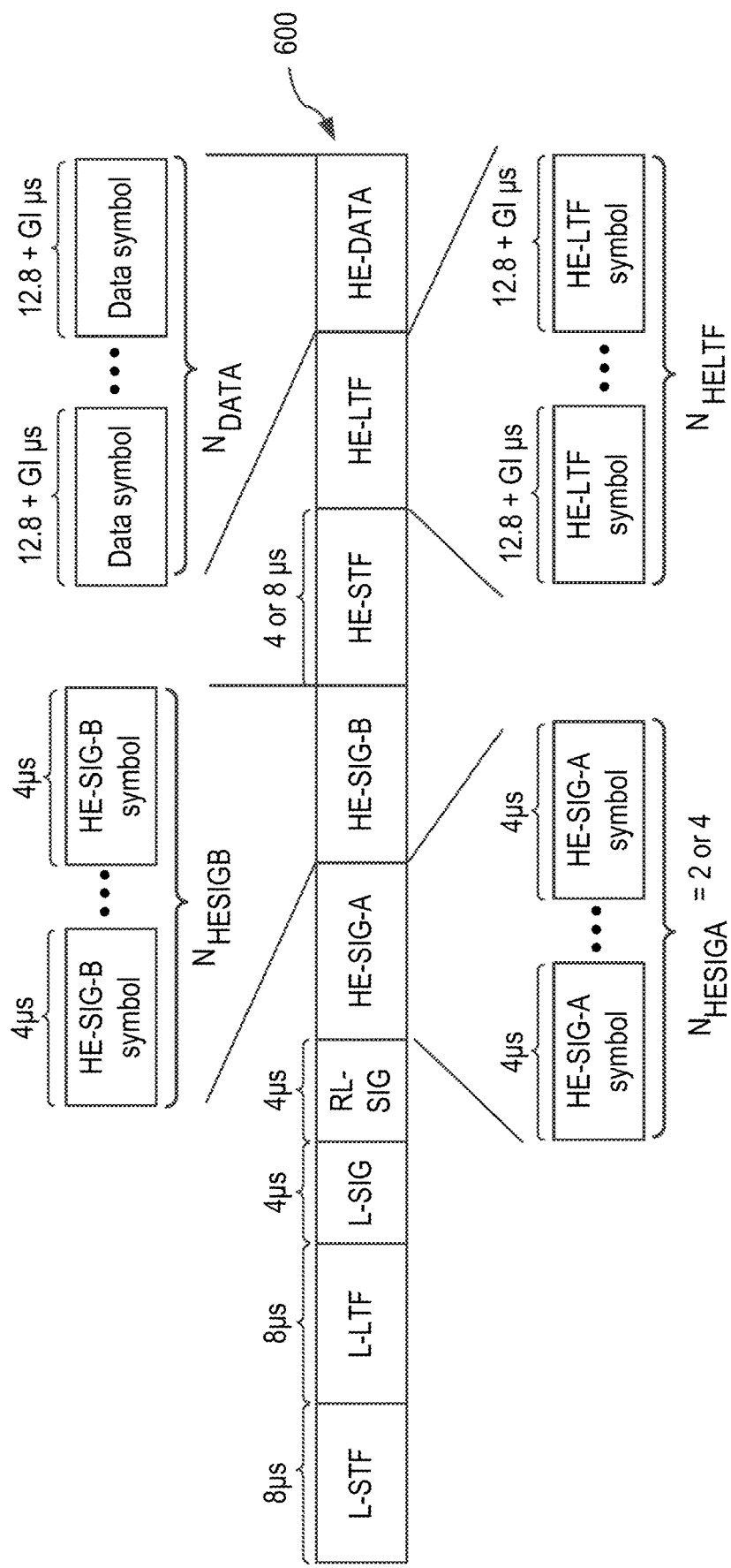
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include NHESIGA symbols, the HE-SIG-B field may include NHESIGB symbols, the HE-LTF field may include NHELTF symbols, and the HE-DATA field may include NDATA symbols. In an aspect, the HE-DATA field may also be referred to as a payload field, data field, data, data signal, data portion, payload, PSDU, or Media Access Control (MAC) Protocol Data Units (MPDU) (e.g., MAC frame).

In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

The table below provides examples of characteristics associated with the various components of the HE frame 600.

| Element | Definition | Duration | DFT period | GI | Subcarrier Spacing | Description |
|---|---|---|---|---|---|---|
| Legacy (L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT | 4 μs | 3.2 μs | 0.8 μs | 312.5 kHz | |

-continued

| Element | Definition | Duration | DFT period | GI | Subcarrier Spacing | Description |
|---|---|---|---|---|---|---|
| RL-SIG | SIGNAL field Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol |

| Element | Definition | Duration | DFT period | GI | Subcarrier Spacing | Description |
|---|---|---|---|---|---|---|
| HE-DATA | HE DATA field | $N_{DATA}$ * (DFT period + GI) μs | 12.8 μs | supports 0.8, 1.6, 3.2 μs | 78.125 kHz | of 12.8 μs excluding GI, and then removing the second half of the OFDM symbol in time domain. $N_{HELTF}$ means the number of HE-LTF symbols and is equal to 1, 2, 4, 6, 8. $N_{DATA}$ means the number of HE data symbols. |

Referring to FIG. 6, the HE frame 600 contains a header and a data field. The header includes a legacy header comprised of the legacy short training field (L-STF), the legacy long training field (L-LTF), and the legacy signal (L-SIG) field. These legacy fields contain symbols based on an early design of an IEEE 802.11 specification. Presence of these symbols may facilitate compatibility of new designs with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. The L-LTF field may be utilized for channel estimation, fine frequency-offset correction, and symbol timing. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE header may be referred to as a non-legacy header. These fields contain symbols that carry control information associated with each PLCP service data unit (PSDU) and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable (e.g., can vary from frame to frame). In an aspect, the HE-SIG-B field is not always present in all frames. To facilitate decoding of the HE frame 600 by a receiver, the size of (e.g., number of symbols contained in) the HE-SIG-B field may be indicated in the HE-SIG-A field. In some aspects, the HE header also includes the repeated L-SIG (RL-SIG) field, whose content is the same as the L-SIG field.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, the HE-LTF field may occupy less than the entire channel bandwidth. In one aspect, the HE-LTF field may be transmitted using a code-frequency resource. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

In one or more implementations, random access PPDU format design and transmission methods are provided to facilitate efficient random access resource utilization. In some aspects, random access resources allocated per station by an AP may be expected to be small in capacity (e.g., a small frequency subband(s)). In an aspect, utilization of smaller random access resources may allow a lower collision probability between random access transmission of different stations than a case in which larger random access resources are utilized. For instance, for a given channel bandwidth, the channel bandwidth can be divided into a large number of small random access resources rather than a small number of large random access resources. The large number of small random access resources may be allocated to the stations for random access transmission. In an aspect, the random access PPDU may be referred to as a random access signal.

In one or more aspects, alternatively or in addition, a random access PPDU format may be utilized to reduce (e.g., further reduce) the collision probability and improve random access signal detection/decoding performance. In some aspects, the random access PPDU may include a first part and a second part. The first part may be identical between stations. The second part may be different between the stations. Each station may transmit the second part on a random access resource (e.g., allocated by the AP and/or selected by the station). In one aspect, the first part may be referred to as a common preamble portion and the second part may be referred to as a STA specific portion or user specific portion.

In some aspects, the STA specific portion may contain more than one HE-LTF symbol even though or even in a case when the random access signal is limited to one spatial stream per station. In one aspect, the common preamble portion may be aligned and identical between random access transmissions (e.g., from different stations). In this aspect, the total number of HE-LTF symbols may also be the same (e.g., aligned and identical between the random access transmissions). However, in an aspect, a transmitted signal for HE-LTF may be different from that of other stations such that the HE-LTF between stations can be orthogonal to each other. The AP may indicate (e.g., in a trigger frame) the number of HE-LTF symbols to be transmitted by the stations.

Figure 7:
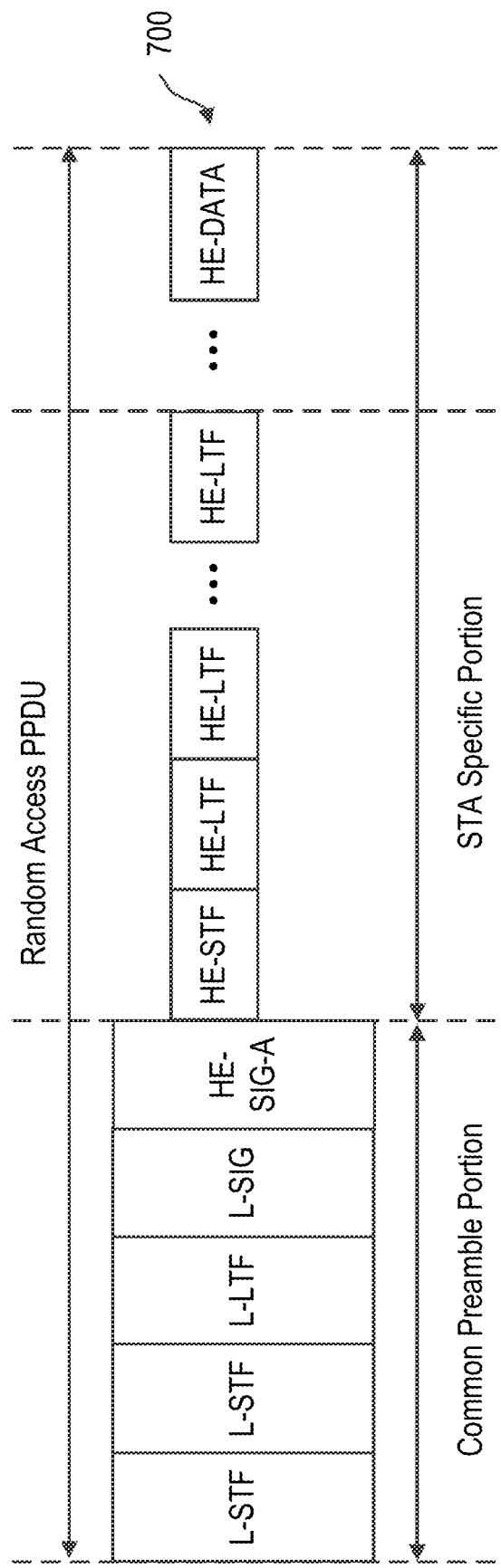
FIG. 7 illustrates an example of a random access physical layer convergence procedure (PLCP) protocol data unit (PPDU).

FIG. 7 illustrates an example of a random access PPDU 700. The description from FIG. 6 generally applies to FIG. 7, with examples of differences between FIG. 6 and FIG. 7 and other description provided herein for purposes of clarity and simplicity. The vertical dimension represents the frequency dimension. In one aspect, a non-AP station utilizes the random access PPDU 700.

The random access PPDU 700 includes a common preamble portion and a STA specific portion. The common preamble portion may include a legacy preamble portion (e.g., L-STF, L-LTF, L-SIG) and an HE-specific preamble portion (e.g., RL-SIG, HE-SIG-A, HE-SIG-B). In some aspects, the various fields of the common preamble portion (e.g., legacy preamble portion, HE-specific preamble portion) may occupy an entire channel bandwidth of the random access PPDU 700. In some aspects, the various fields of the STA specific portion (e.g., HE-STF, HE-LTF, HE-DATA) may occupy less than the entire channel bandwidth. For instance, the STA specific portion may occupy one or more resource units within the channel bandwidth (e.g., a frequency subband(s)) associated with (e.g., allocated to, selected by) the station that transmits the random access PPDU 700. In one aspect, the random access PPDU 700 does not include HE-DATA (e.g., does not include any data symbols). In such an aspect, the random access PPDU 700 may be, or may be referred to as, a null data packet (NDP) or a non-data packet. In one aspect, the random access PPDU 700 may include an L-STF, L-LTF, L-SIG, RL-SIG, and HE-SIG-A field.

In some aspects, the HE-LTF may span more spatial streams than the number of receive (Rx) antennas at the AP. As an example, N HE-LTF symbols may be utilized even if the random access PPDU 700 is transmitted using one spatial stream, where N>1. In other words, N may be larger than the total number of receive antennas at the AP. As another example, the AP may only have two receive antennas, but request that stations use eight HE-LTF symbols (e.g., as if there are a total of eight transmit (Tx) antennas). In some cases, the station may select (e.g., randomly select, pseudorandomly select) a spatial stream to utilize for transmission. In contrast, typically, an AP with M (e.g., four) receive antennas may only be able to process up to M spatial streams and, therefore, would expect to receive an HE-LTF that spans M spatial streams.

In one or more aspects, the stations may transmit the HE-LTF symbols using respective random access resource(s) associated with the stations. In an aspect, the random access resource may have two dimensions: one dimension in frequency domain and one dimension in code domain. In this aspect, the random access resource may include, or may be referred to as, a code-frequency resource(s).

Figure 8:
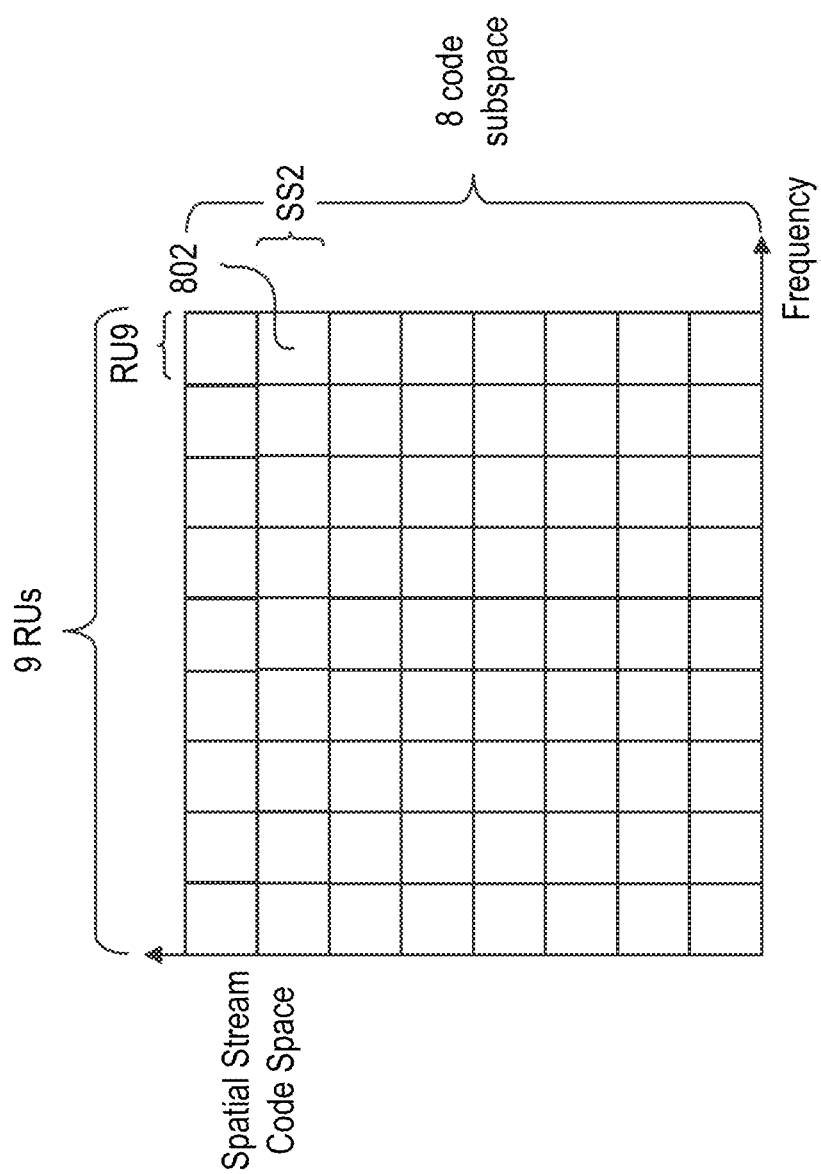
FIG. 8 illustrates an example of resources that may be utilized for random access.

FIG. 8 illustrates an example of resources that may be utilized for random access. The random access resources may be utilized for transmission of HE-LTF symbols in a random access channel (e.g., of channel bandwidth 20 MHz). The vertical dimension represents the code dimension and the horizontal dimension represents the frequency dimension.

In FIG. 8, in the frequency domain, the channel bandwidth is divided into nine resource units (e.g., frequency subbands). In an aspect, if eight HE-LTF orthogonal frequency division multiplexing (OFDM) symbols are transmitted, HE-LTF may have in total 72 random access resource candidates (e.g., 8 code spaces×9 resource units=72 resource candidates). Each random access resource candidate is represented as a rectangular block in FIG. 8. In an aspect, rectangular block in FIG. 8 is associated with a resource unit (RU) index and a spatial stream (SS) index. For instance, a block 802 is associated with a resource unit of resource unit index 9 (RU9) and spatial stream of spatial stream index 2 (SS2). Each station may select (e.g., randomly select, pseudorandomly select) one of the eight code spaces. In an aspect, a code space may be referred to simply as a code. In an aspect, the eight code spaces are orthogonal to each other. Such code spaces may traditionally be mapped to different spatial streams in downlink/uplink MIMO transmissions.

In an aspect, correct decoding of a single stream transmission (e.g., rank 1 transmission) may be achieved using only one HE-LTF symbol in some cases. In an aspect, additional HE-LTF symbols may be utilized to facilitate detecting a presence of a data portion (e.g., HE-DATA field) in the same frequency resource unit and/or to improve decoding of the data portion when random access signals have collided in frequency.

FIG. 9 illustrates an example of a mapping matrix PLTF. In FIG. 9, the PLTF matrix is an 8×8 matrix. In an aspect, the PLTF matrix may be referred to as a $P_{8 \times 8}$ matrix. The column dimension of the PLTF matrix may correspond to the number of HE-LTF symbols and/or time domain. The row dimension of the PLTF matrix may correspond to the number of spatial streams. In this regard, each row of the PLTF matrix may be associated with a respective code space. In an aspect, if eight HE-LTF OFDM symbols are used, the PLTF matrix of FIG. 9 may be utilized to modulate the HE-LTF OFDM symbols. For instance, if a station selects (e.g., randomly selects, pseudorandomly selects) the third code space, then the station may use the eight elements of the third row of the PLTF matrix to modulate the eight HE-LTF symbols.

In some aspects, to help ensure that the HE-LTF from different stations are orthogonal, the AP may indicate to the stations the number of HE-LTF symbols (or a dimension of a virtual antenna) in a trigger frame. In an aspect, the number of HE-LTF symbols can be larger than the number of receive antennas of the AP. The station may select (e.g., randomly select, pseudorandomly select) a code (e.g., a row of the PLTF matrix) to apply to the transmission of the HE-LTF symbols. In an aspect, the station may select (e.g., randomly select, pseudorandomly select) a spatial stream among all possible spatial streams.

In some aspects, a PPDU capture effect may occur when the AP is able to receive and successfully decode a frame, even though the frame has collided with another frame. For uplink random access, this is typically not possible since different stations transmit simultaneously and the HE-LTF of the different stations may be air-combined (e.g., radio frequency (RF)-combined). The air-combined HE-LTFs of the different stations may cause incorrect (e.g., completely wrong in some cases) channel estimation results.

If two stations occupying the same resource unit (e.g., a frequency position(s), a frequency subband(s)) use different code to send the HE-LTF, the AP may be able to perform channel estimation correctly. In an aspect, whether respective data (e.g., payload, HE-DATA) of the two stations may be decoded correctly by the AP may be based on a modulation and coding scheme (MCS) that is utilized. For instance, in some cases, the HE-LTF sent using different code may be orthogonal (e.g., may be guaranteed to be orthogonal). In such cases, if the data is sent in a sufficiently low MCS, the AP may be able to decode the respective data of each station.

Although the foregoing description makes reference to collisions involving transmissions from two stations, the collisions may also involve transmissions from more than two stations. In such a case, if these stations (e.g., more than two stations) occupy the same resource unit but use different code to send the HE-LTF, the AP may be able to perform channel estimation correctly.

Figure 10:
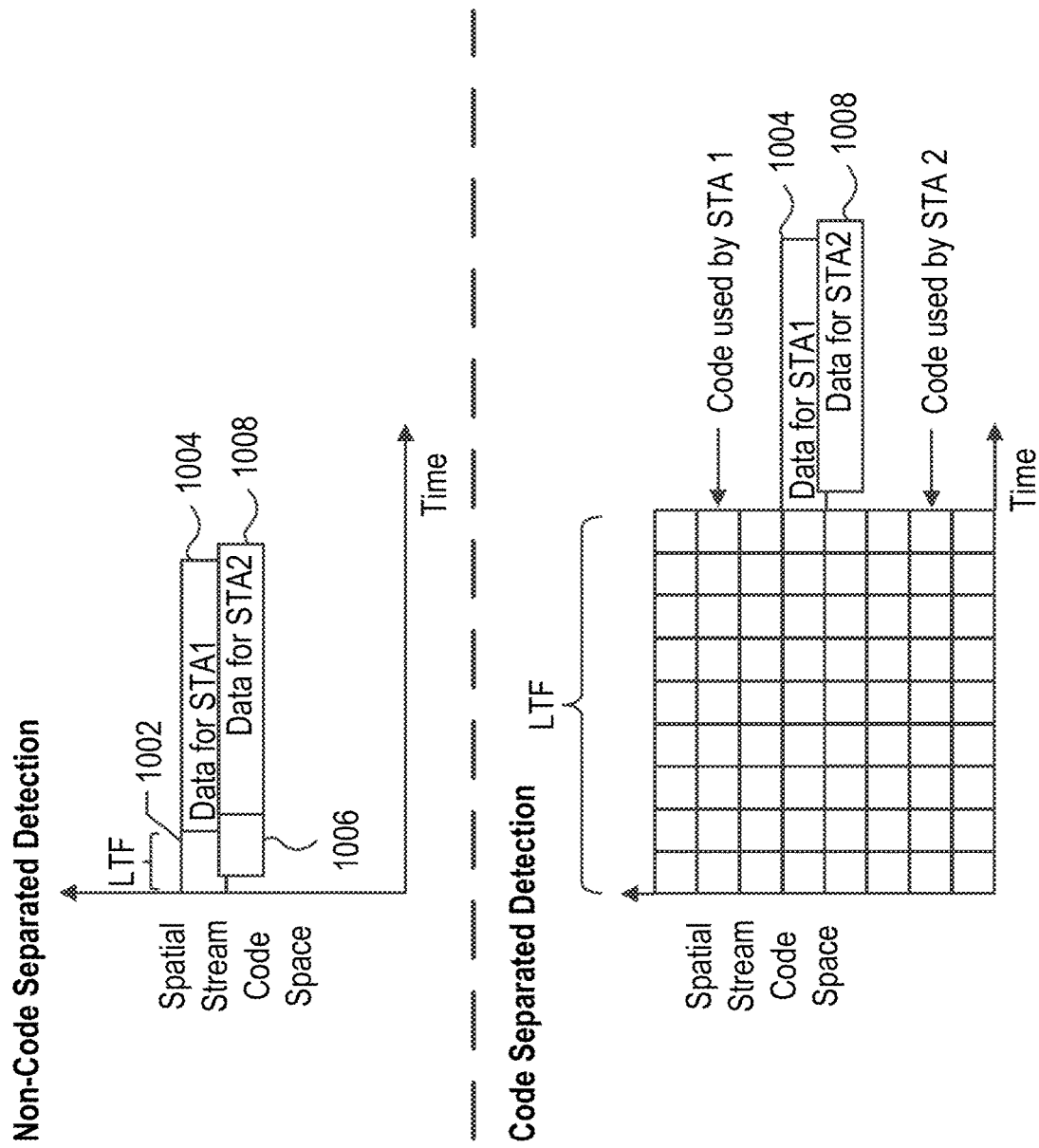
FIGS. 10 and 11 illustrate examples of comparisons of multiple detection methods.

FIG. 10 illustrates an example of a comparison of two detection methods. In FIG. 10, the detection methods include a detection method that utilizes code separation and a detection method that does not utilize code separation, respectively referred to as code separated detection method and non-code separated detection method. In the non-code separated detection method, STA1 and STA2 may each transmit (e.g., simultaneously transmit) a respective uplink frame that includes a respective HE-LTF 1002 and 1006 and respective data 1004 and 1008. STA1 and STA2 may transmit the uplink frames in the same resource units (e.g., frequency subbands). The HE-LTFs 1002 and 1006 may be modulated using the same code and may be air-combined (e.g., RF-combined). Since the same code and same resource units are used in the transmission of the HE-LTFs 1002 and 1006, channel estimation based on the HE-LTFs 1002 and 1006 may be incorrect (e.g., corrupted). In such a case where the channel estimation is incorrect, the AP is generally unable to decode the data 1004 and 1008 correctly. For instance, in this case, the data 1004 and 1008 may be almost impossible to decode correctly.

In the code separated detection method, STA1 and STA2 may each transmit (e.g., simultaneously transmit) a respective uplink frame that includes a respective HE-LTF and the respective data 1004 and 1008. STA1 and STA2 may transmit the uplink frames in the same resource units. In this regard, STA1 and STA2 may have selected (e.g., randomly selected) the same resource units. STA1 and STA2 may modulate their respective HE-LTF using different code. For instance, in FIG. 10, STA1 utilizes a second code space (e.g., associated with a second row of the PLTF matrix) and STA2 utilizes a seventh code space (e.g., associated with a seventh row of the PLTF matrix). In an aspect, the eight code spaces are orthogonal to each other. In this aspect, the second code space (e.g., used by STA1) and the seventh code space (e.g., used by STA2) are orthogonal to each other. In an aspect, STA1 and STA2 may select (e.g., randomly select, pseudorandomly select) the code space to utilize. When the HE-LTFs utilized by STA1 and STA2 are orthogonal, the AP may obtain correct channel estimation for STA1 and STA2. In such a case, although the data 1004 and 1008 occupy the same resource unit and thus interfere with each other, the AP may be able to correctly decode the data 1004 and 1008 since the AP has the correct channel estimation for both the data 1004 and 1008. For instance, the AP may be able to correctly decode the data 1004 and 1008 in cases where the MCS is lower.

Figure 11:
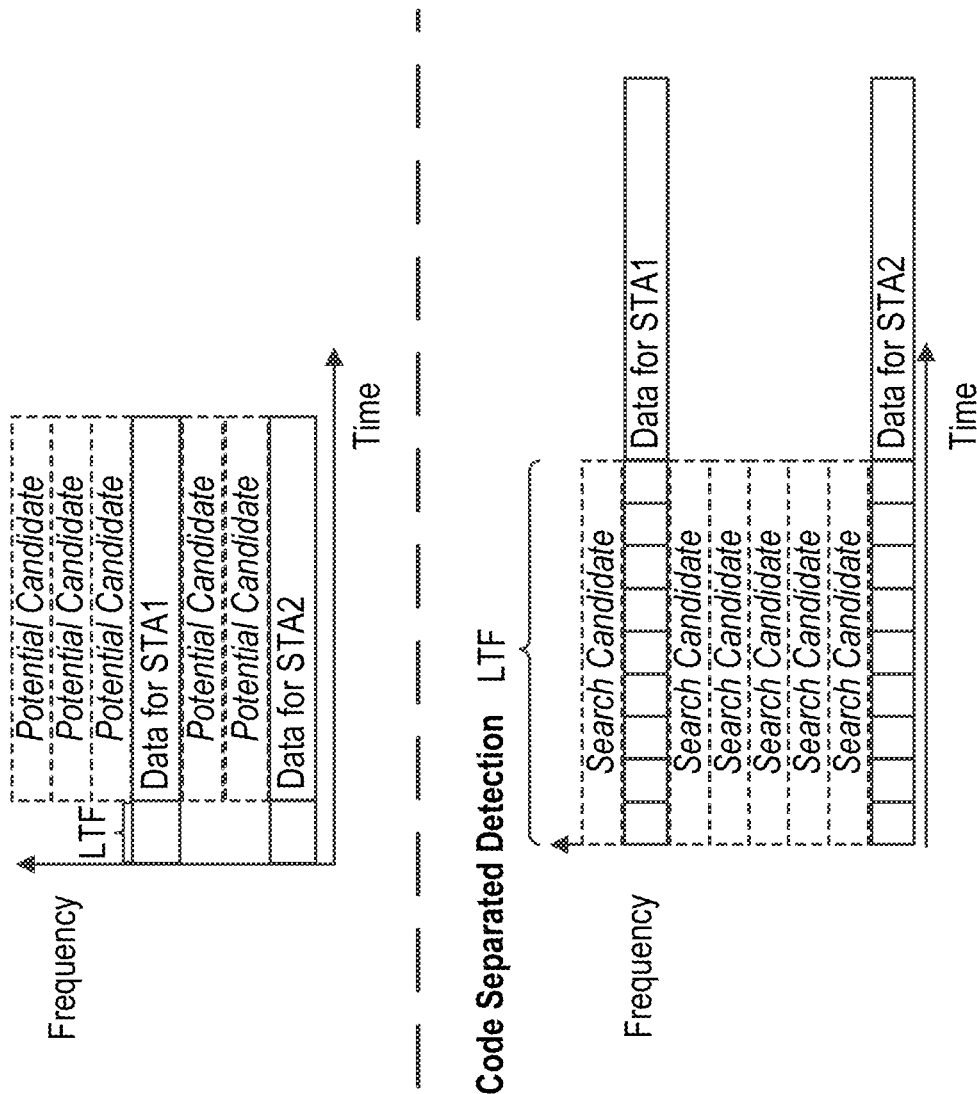

In one or more aspects, the AP may utilize the HE-LTF OFDM symbols to detect presence of data transmissions. FIG. 11 illustrates another example of a comparison between two detection methods. In FIG. 11, the detection methods include a code separated detection method and a non-code separated detection method. In some aspects, the detection of the presence of a random access signal can be performed by detection of the HE-LTF signals in a particular code space and/or frequency domain (e.g., resource unit). Detection performance may be enhanced when multiple HE-LTF OFDM symbols are utilized, such as in the code separated detection method.

In an aspect, similar to detection of L-STF and L-LTF, a structure (e.g., repetitive structure) of the HE-LTFs may allow improvement in detection of a signal (e.g., detection of presence of data). When the presence of data is detected by the AP, the AP may decode those resource unit(s) where HE-LTF has been detected (e.g., rather than decoding all resource units in which data may possibly be transmitted). In some cases, the use of a single HE-LTF symbol is not sufficiently reliable for detecting the presence of data in a certain resource (e.g., frequency resource unit). For instance, in the non-code separated detection method, the AP may have to decode all possible resource units (e.g., potential candidates) to determine the resource unit(s) within which data has been transmitted.

In one or more implementations, random access may be utilized by stations to indicate existence of information to send in the uplink. In some aspects, the AP may transmit a trigger frame to request/solicit the stations to transmit such an indication. In some aspects, such as in response to the trigger frame, the stations may transmit a short random access PPDU to indicate existence of information to send in the uplink. In such aspects, the trigger frame may be referred to as a random access trigger frame or a random access trigger. In one aspect, the short random access PPDU may include a small payload (e.g., small HE-DATA). By way of non-limiting example, the payload may include an indication of whether the station has data to send in the uplink and/or a buffer status report of the station. In another aspect, the random access PPDU may be a non-data containing PPDU (e.g., NDP packet). For instance, instead of a station transmitting a short data packet (e.g., data packet with a small HE-DATA field), the station may transmit the common preamble portion and only up to and including the HE-LTF of the STA specific portion of the preamble. In other words, the station does not send any data (e.g., data field, HE-DATA). Use of the non-data containing PPDU may allow a reduction in overhead associated with signaling, to the AP, the existence of information to send in the uplink. In an aspect, the trigger frame may include an indication to the stations whether to send a short random access PPDU that includes a small payload or a short random access PPDU with no payload (e.g., non-data containing PPDU, NDP frame) in response to the trigger frame.

In an aspect, the station may transmit the short random access PPDU (e.g., non-data containing PPDU) to the AP when (e.g., only when) the station has data to send in the uplink. In an aspect, the AP may transmit a trigger frame to facilitate UL MU transmission based on the short random access PPDU(s) received (or not received) from the stations.

In one or more aspects, the AP may assign a specific code-frequency resource to a specific station or group of stations. The specific code-frequency resource may be associated with one or more spatial stream indices and one or more resource unit indices. In these aspects, the spatial stream index or indices and resource unit index or indices may be used to identify the specific station or group of stations during random access. In this regard, the specific station or group of stations may utilize the specific code-frequency resource(s) that are assigned/allocated to indicate existence of data to be sent to the AP. The code-frequency resource may be utilized for transmission of HE-LTF symbols. In an aspect, the specific code-frequency resource may be referred to as a specific code-frequency LTF resource or specific code-frequency HE-LTF resource. For example, each code-frequency resource can be assigned to a specific association identification (AID) of a station.

In one embodiment, the station may transmit a short random access PPDU to the AP using a code to indicate that the station has data to send in the uplink, and another code to indicate that the station does not have data to send in the uplink. In an aspect, this may require that the AP assign a set of codes, for example one code for positive acknowledgement of data to send and one code for negative acknowledgement of data to send, to each station or group of stations during a short random access.

Figure 12:
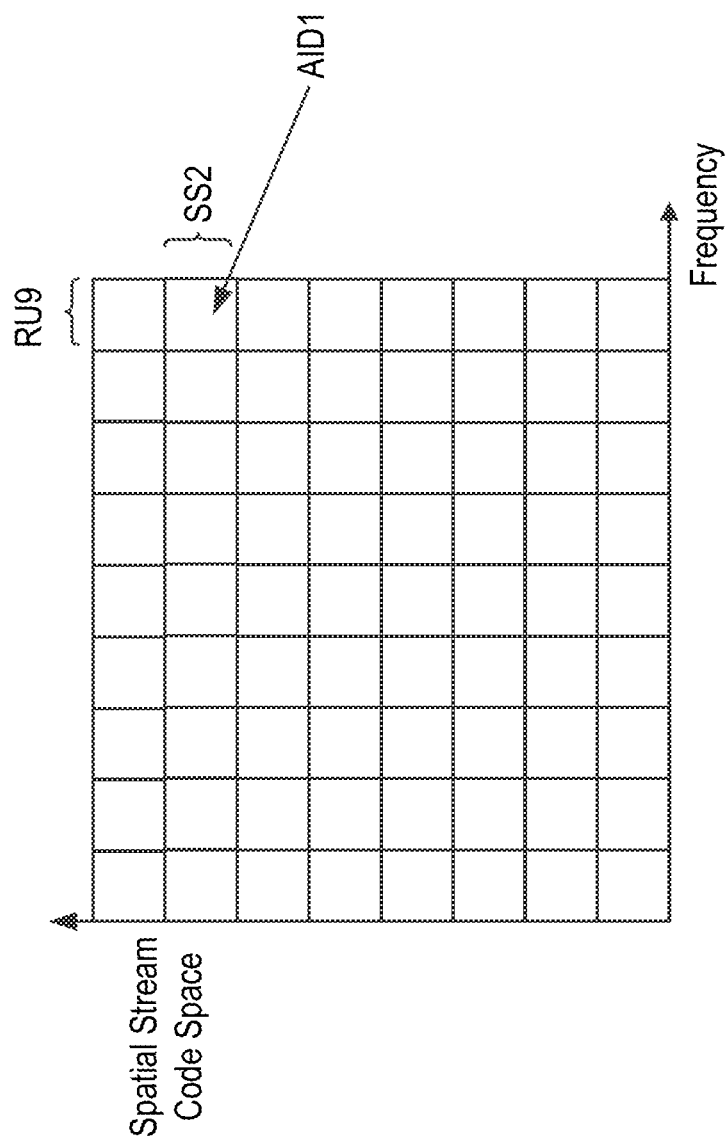
FIG. 12 illustrates an example of an allocation of a code-frequency resource.

FIG. 12 illustrates an example of an allocation of a code-frequency resource. In FIG. 12, 72 code-frequency resources are shown. Each code-frequency resource is associated with a resource unit index and a spatial stream index. In an aspect, the term index may be referred to as a number, such that each code-frequency resource is associated with a resource unit number and a spatial stream number. The AP may assign different stations (or different AIDs) to different frequency and/or code blocks. Each station (or each AID) may be mapped to a particular resource unit index and a spatial stream index. The mapping may change (including no mapping) depending on signaling (e.g., in a trigger frame). In some cases, each AID may be uniquely mapped to a RU index and SS index. In FIG. 12, a station or group of stations associated with AID1 may be assigned the code-frequency resource (RU9, SS2). In some cases, the mapping may not be unique, such that a code-frequency resource (RU #, SS #) may be shared by multiple AIDs. In such a case, the shared code-frequency resource(s) may be assigned in a manner such that collision probability is low.

In some aspects, the detection of an HE-LTF in a specific code-frequency resource may indicate that a station has data to send to the AP. Different mapping of station (or group of stations) to a code-frequency resource can be possible. In an aspect, the different mapping, denoted as different random access types, may be indicated in a trigger frame transmitted by the AP. In an aspect, the random access type may be referred to as a random access group or random access sequence number. The random access type may be utilized to aid stations in identifying and differentiating between different random access opportunities. Each station may be associated with a random access type, a code, and a resource unit. A station, upon reception of the trigger frame, may identify the mapping between code-frequency resource and associated AID (or group of AIDs) and transmit random access signal according to the identified mapping.

Figure 13:
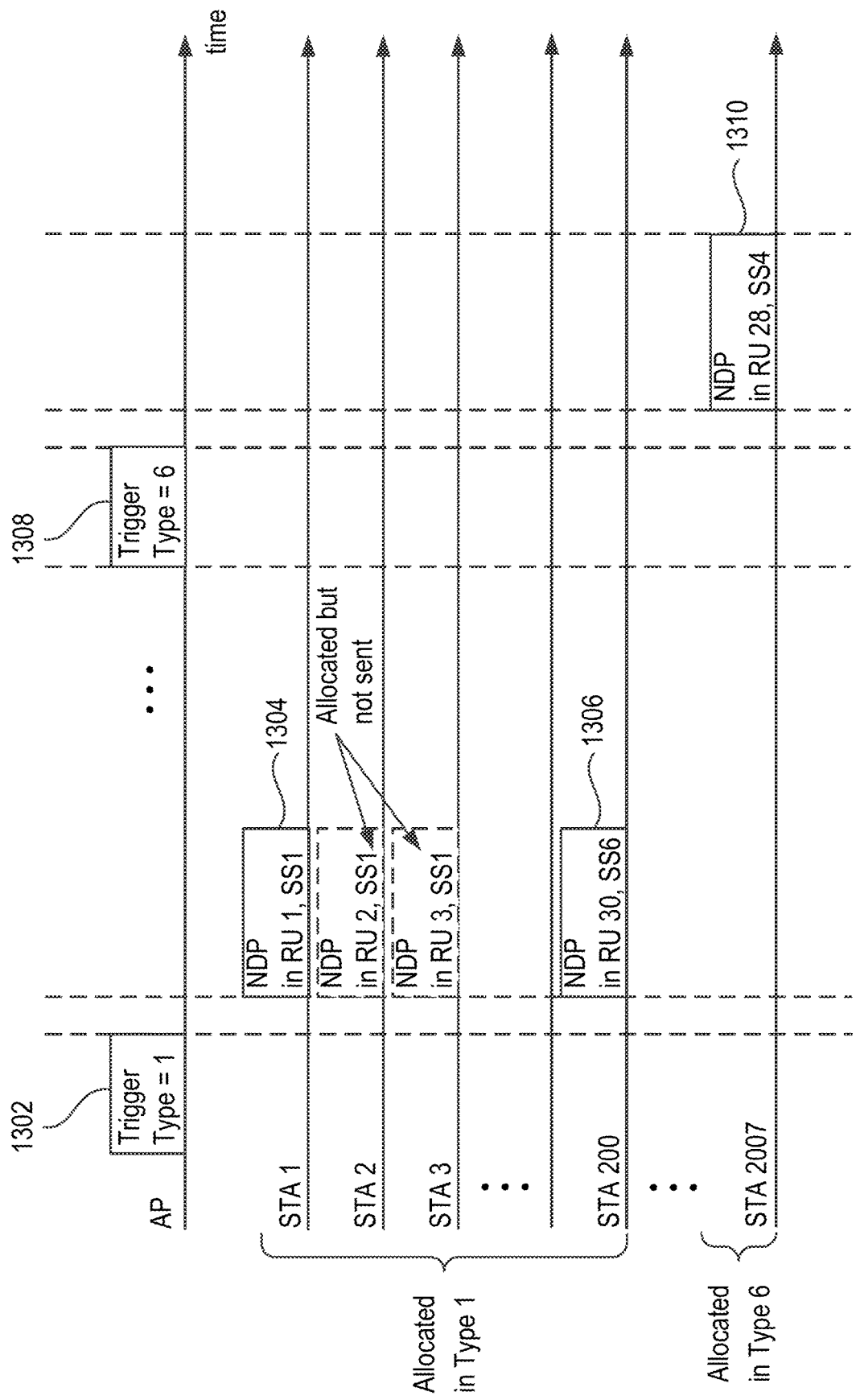
FIGS. 13 through 15 illustrate schematic diagrams of examples of an exchange of frames among wireless communication devices for communication in a wireless network for multi-user transmission.

FIG. 13 illustrates a schematic diagram of an example of an exchange of frames among wireless communication devices for communication in a wireless network for UL MU transmission. The AP may transmit a trigger frame 1302. The trigger frame 1302 may include an indication of a random access type. In FIG. 13, the trigger frame 1302 includes an indication of a random access type 1, which includes a mapping of resources allocated to the group of stations formed of STA1, STA2, STA3, . . . , STA200. The trigger frame 1302 may include code-frequency resource allocation for each of the stations in the group of stations associated with the random access type 1. For instance, STA1, STA2, STA3, and STA200 may be allocated (RU 1, SS 1), (RU 2, SS 1), (RU 3, SS 1), and (RU 30, SS 6), respectively.

STA1 and STA200 may process the trigger frame 1302 received from the AP and may transmit a random access PPDU 1304 and 1306, respectively, in their allocated code-frequency resource. In an aspect, STA1 and STA200 may transmit the random access PPDU 1304 and 1306, respectively, as an indication that they have data to send in the uplink. In contrast, in this aspect, although STA2 and STA3 are allocated a code-frequency resource, STA2 and STA3 do not send a random access PPDU since they do not have any data to send in the uplink. The AP may transmit a trigger frame 1308 that includes an indication of a random access type 6, which includes a mapping of resources allocated to STA2007. For instance, STA2007 may be allocated (RU 28, SS 4). In response to the trigger frame 1308, STA2007 may transmit a random access PPDU 1310 (e.g., as an indication that STA2007 has data to send in the uplink).

In some cases, the random access PPDUs 1304, 1306, and 1310 may be non-data packets (e.g., 1304, 1306, 1310 have no data field). In these cases, an NDP is used for STA1 and STA200's random access in response to the trigger frame 1302, and an NDP is used for STA2007's random access in response to the trigger frame 1308.

In an aspect, the same code-frequency resource may be allocated to stations associated with different random access types. As an example different from that shown in FIG. 13, the code-frequency resource (e.g., RU 1, SS1) that is allocated to one station (e.g., STA1) associated with the random access type 1 may also be allocated to a station (e.g., STA2007) of another random access type.

It is noted that the ellipses between the STA3 and STA200 may indicate that one or more additional stations or no stations are present between the STA3 and STA200. Similarly, it is noted that the ellipses between the STA200 and STA2007 may indicate that one or more additional stations or no stations are present between the STA200 and STA2007. It is noted that the ellipses between the random access PPDUs 1304 and 1306 and the trigger frame 1308 may indicate that one or more additional frame exchanges or no frame exchanges are present between the random access PPDUs 1304 and 1306 and the trigger frame 1308. For instance, the AP may transmit trigger frames to stations associated with a random access type different from random access type 1 and 6.

In some cases, the code-frequency resources of the random access PPDU can be allocated to different access categories (ACs). For example, if STA1 has data in its AC voice (AC-VO) queue and STA2 has data in its AC best effort (AC-BE) queue, STA1 may send a random access signal (e.g., random access PPDU) using a set of code-frequency resources allocated to AC-VO and STA2 may send a random access signal using a set of code-frequency resources allocated to AC-BE. In an aspect, the allocated code-frequency resources may not need to be singular. In such a case, the station may select (e.g., pseudo-randomly select) one of the code-frequency resources for random access transmission.

In some cases, the random access resources assigned to one or more stations may be dependent on a lowest backoff timer value of an uplink traffic enhanced distributed channel access function (EDCAF). For example, stations with the lowest backoff timer of 1 may use a set of random access resources to transmit (e.g., potentially transmit) a random access signal and stations with a lowest backoff timer of 4 may use a different set of random access resources to transmit (e.g., potentially transmit) a random access signal. In such a case, the random access resources assigned to a lower backoff timer value may be prioritized and assigned more resources compared to random access resources available for higher backoff timer values. In an aspect, the random access signal may contain information on the backoff timer of each non-empty AC queue.

In some aspects, a non-data carrying random access signal (e.g., the non-data carrying random access signal described above) may allow multiplexing a large number of resources in a single random access PPDU opportunity. In one aspect, a drawback, however, can be lack of information conveyed to the AP. To overcome this drawback, a random access procedure can be performed in a two-step approach, as described below.

In a first step, the AP may transmit a trigger frame to solicit a random access PPDU (e.g., short random access PPUD) from one or more stations. In a second step, the AP may transmit a trigger frame to solicit UL MU PPDUs containing data (e.g., HE-DATA) from the station(s) that transmitted a random access PPDU(s) in the first step. In an aspect, the resources allocated in the first step may be smaller than the resources allocated in the second step. For instance, smaller and/or fewer frequency subbands may be allocated to each station during the first step.

Figure 14:
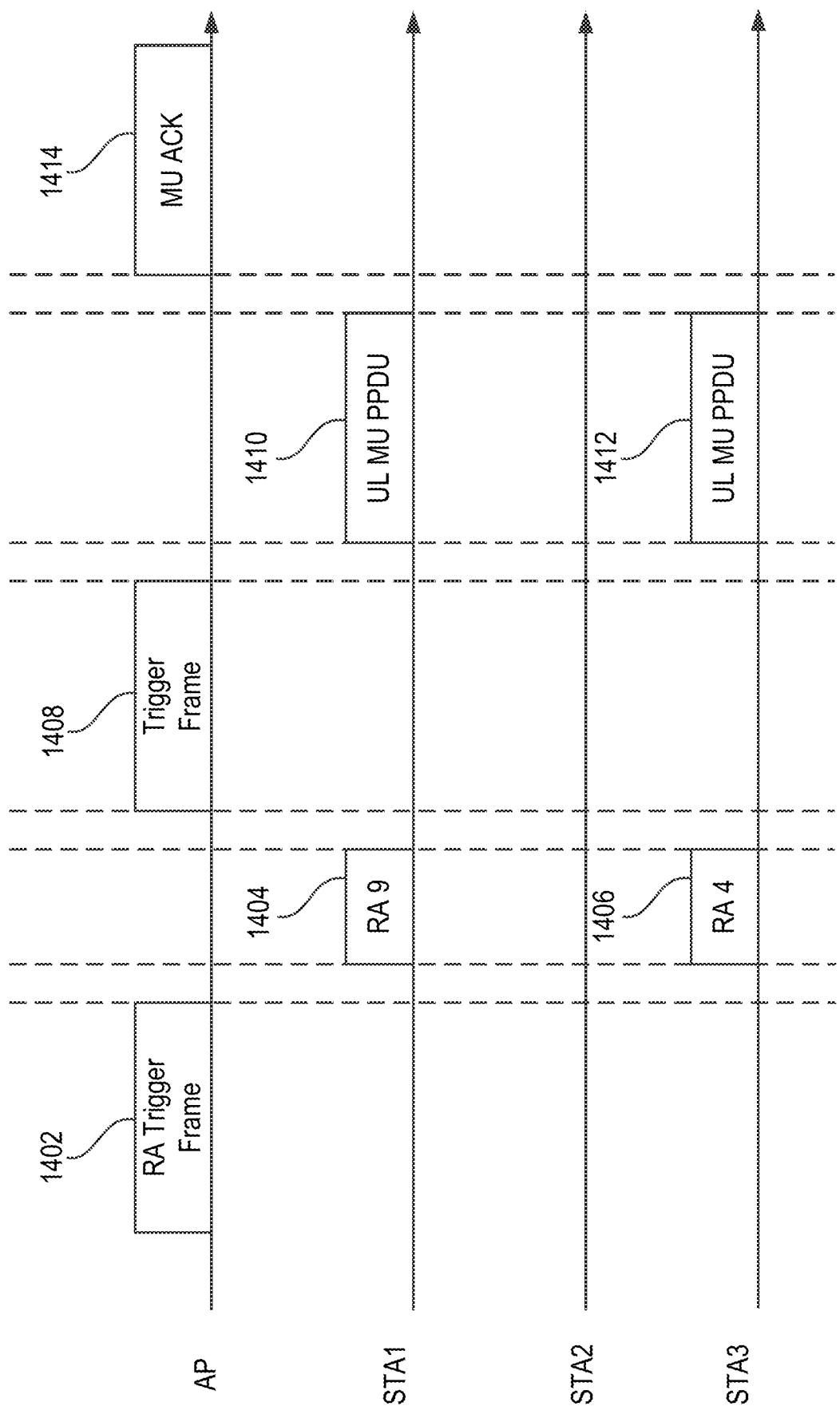

FIG. 14 illustrates a schematic diagram of an example of exchanges of frames among wireless communication devices for UL MU transmission, where the two-step approach is utilized. The AP may transmit a trigger frame 1402. In an aspect, the trigger frame 1402 may be referred to as a random access trigger frame or a random access trigger. In an aspect, the trigger frame 1402 may be utilized for soliciting random access signals (e.g., non-data carrying random access signals). The random access signals may be non-data carrying random access signals (e.g., no HE-DATA field). In an aspect, the AP may allocate the resources utilized by each station for random access signal transmission and indicate the allocated resources in the trigger frame 1402. For instance, the AP may allocate resources to STA1, STA2, and STA3.

In some cases, the resources (e.g., frequency resource unit(s), code(s)) that each station can use for random access signal transmission may be unique (e.g., orthogonal), such that each station is exclusively allocated its own respective resources. In some cases, the resources that each station may use are shared between stations. In such cases, the total resources (e.g., potential resources to be allocated) are sufficiently large so as to be statistically sufficient to achieve a low probability of collision (e.g., to facilitate no two stations using the same resources with high probability).

STA1 and STA3 may transmit random access PPDU 1404 and 1406, respectively. STA1 may transmit the random access PPDU 1404 using a random access resource RA9 allocated to STA1 (e.g., in the trigger frame 1402) for random access transmission. STA3 may transmit the random access PPDU 1406 using a random access resource RA4. Each of RA9 and RA4 may be associated with one or more resource unit indices and one or more spatial stream indices. In an aspect, RA9 and RA4 are used for transmitting a STA specific portion of the random access PPDU 1404 and 1406, respectively. In an aspect, STA1 and STA3 may transmit the random access PPDUs 1404 and 1406, respectively, to indicate that they have data to send in the uplink. In contrast, in this aspect, STA2 does not send a random access PPDU since STA2 does not have any data to send in the uplink.

Once the AP receives the random access PPDUs 1404 and 1406, the AP may transmit a second trigger frame 1408 to solicit uplink data from STA1 and STA3. The trigger frame 1408 may include resource allocation information (e.g., resource unit, spatial code) to be utilized for data transmission by STA1 and STA3. In response to the trigger frame 1408, STA1 and STA3 may transmit a PPDU 1410 and 1412 that contains data. The PPDUs 1410 and 1412 may be transmitted based on respective resources allocated to STA1 and STA3. The AP may transmit an acknowledgement frame 1414 (e.g., multi-user (MU) acknowledgement frame) upon receipt of the PPDUs 1410 and 1412.

In some aspects, the resources allocated for data transmission may be larger (e.g., larger resource unit(s)) than the resources allocated for random access transmission. In some cases, the AP may allocate resources (e.g., indicated using the trigger frame 1402) for a larger number of stations for the random access transmission. The AP may then allocate resources (e.g., indicated using the second trigger frame 1408) to a smaller number of stations for the data transmission. For instance, the AP may allocate resources for data transmission for those stations that indicated they have data to send (e.g., by sending PPDU 1404, 1406).

Figure 15:
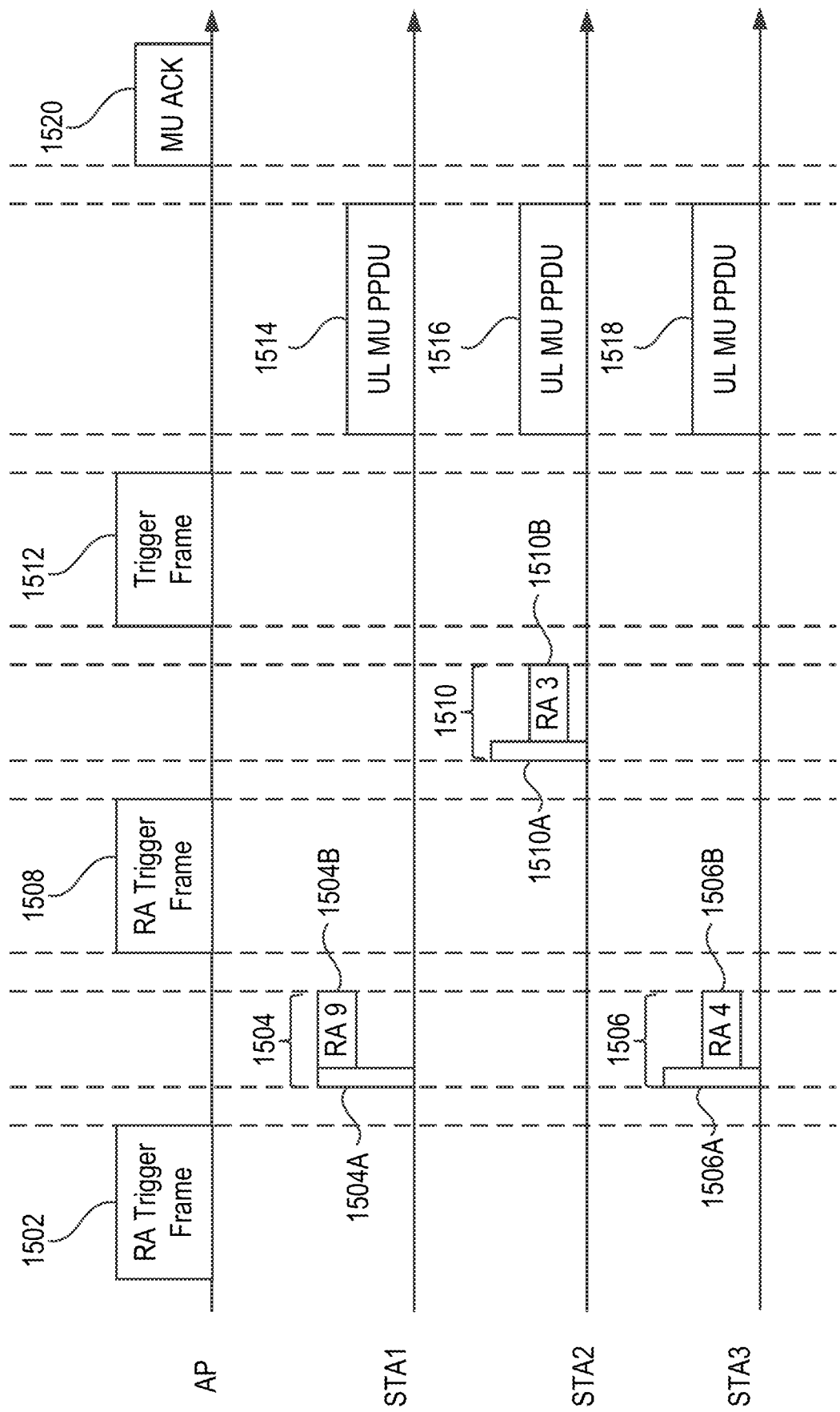

FIG. 15 illustrates a schematic diagram of another example of exchanges of frames among wireless communication devices for UL MU transmission, where the two-step approach is utilized.

The AP may transmit a trigger frame 1502 to station(s) associated with a random access type A. The trigger frame 1502 may allocate resources to the station(s) associated with the random access type A. In FIG. 15, the station(s) associated with the random access type A may include STA1 and STA3. In response to the trigger frame 1502, STA1 and STA3 may transmit a random access PPDU 1504 and 1506, respectively. STA1 may transmit the random access PPDU 1504 using a random access resource RA9 allocated to STA1 (e.g., in the trigger frame 1502) for random access transmission. STA3 may transmit the random access PPDU 1506 using a random access resource RA4. The random access PPDU 1504 may include a common preamble portion 1504A and a STA specific portion 1504B. The random access PPDU 1506 may include a common preamble portion 1506A and a STA specific portion 1506B. The common preamble portions 1504A and 1506A may occupy the entire channel bandwidth of the random access PPDUs 1504 and 1506, respectively. The STA specific portions 1504B and 1506B may be transmitted using RA9 and RA4, respectively.

The AP may transmit a trigger frame 1508 to station(s) associated with a random access type B. The trigger frame 1508 may allocate resources to the station(s) associated with the random access type B. In FIG. 15, the station(s) associated with the random access type B may include STA2. In response to the trigger frame 1508, STA2 may transmit a random access PPDU 1510 that includes a common preamble portion 1510A and a STA specific portion 1510B. The STA specific portion 1510B may be transmitted using a random access resource RA3. In an aspect, the random access PPDUs 1504, 1506, and 1510 may be non-data carrying random access PPDUs (e.g., no data field, no HE-DATA field).

The AP may transmit a trigger frame 1512 to solicit uplink data from STA1, STA2, and STA3. The trigger frame 1512 may include resource allocation information (e.g., resource unit, spatial code) to be utilized for data transmission by STA1, STA2, and STA3. In response to the trigger frame 1512, STA1, STA2, and STA3 may transmit a PPDU 1514, 1516, and 1518, respectively, that contains data. The PPDUs 1514, 1516, and 1518 may be transmitted based on respective resources allocated to STA1, STA2, and STA3 by the trigger frame 1512. The AP may transmit an acknowledgement frame 1520 (e.g., multi-user (MU) acknowledgement frame) upon receipt of the PPDUs 1514, 1516, and 1518.

Although FIG. 15 illustrates an example in which the AP transmits trigger frames (e.g., 1502, 1508) to solicit random access PPDUs (e.g., 1504, 1506, 1510) from stations associated with two different random access types (e.g., type A, type B), the AP may transmit trigger frames to solicit random access PPDUs from more, fewer, and/or different random access types than those shown in FIG. 15. In an aspect, the AP may transmit trigger frames (e.g., 1512) to solicit uplink data from stations of different random access types (e.g., STA1 and STA3 of random access type A, STA2 of random access type B).

The horizontal dimension in FIGS. 10, 11, 13, 14, and 15 represent the time dimension. In some aspects, a time interval between any two frames in FIGS. 13 through 15 may be an SIFS, PIFS, or any other time interval.

Referring to FIGS. 6, 7, 13, 14, and 15, in one or more implementations, a trigger frame (e.g., 1302, 1308, 1402, 1408, 1502, 1508, 1512) may include all or some of the fields of an HE frame 600, and an uplink random access frame (e.g., 1304, 1306, 1310, 1404, 1406, 1504, 1506, 1510) may include all or some of the fields of a random access PPDU 700, excluding the HE-DATA field. In one or more implementations, an uplink data frame (e.g., 1410, 1412, 1514, 1516, 1518) may include the HE-DATA field of a random access PPDU 700 and some or all of the other fields of the random access PPDU 700.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 16A:
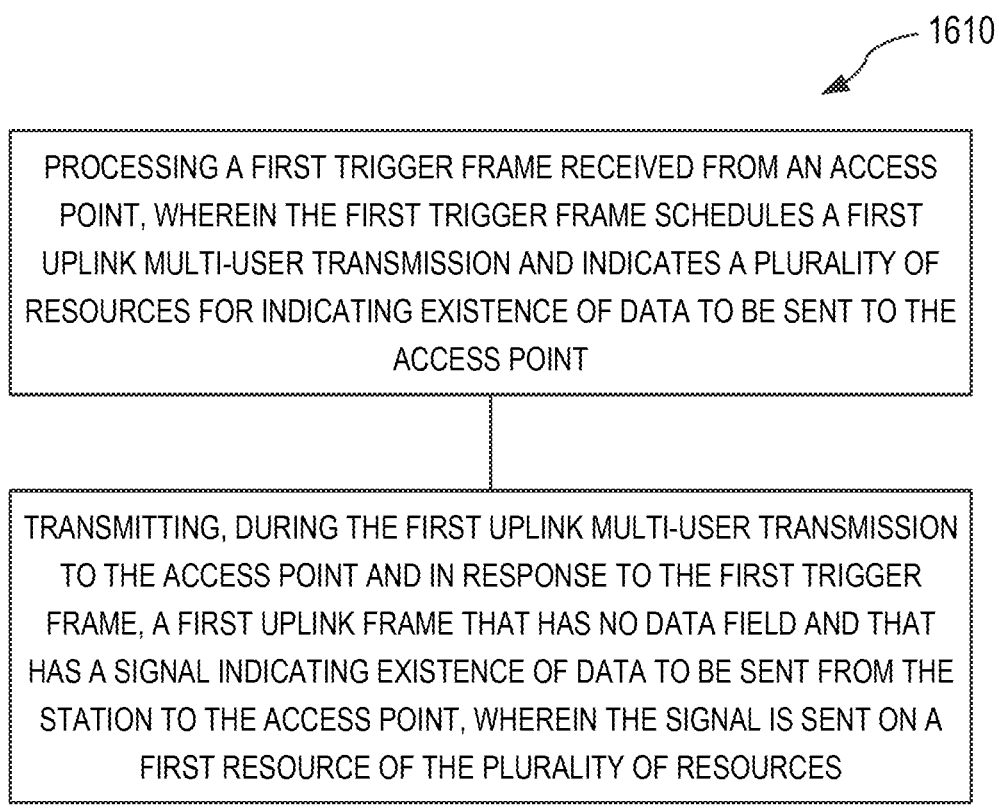
FIGS. 16A and 16B illustrate flow charts of examples of methods for facilitating wireless communication for uplink transmission.
Figure 16B:
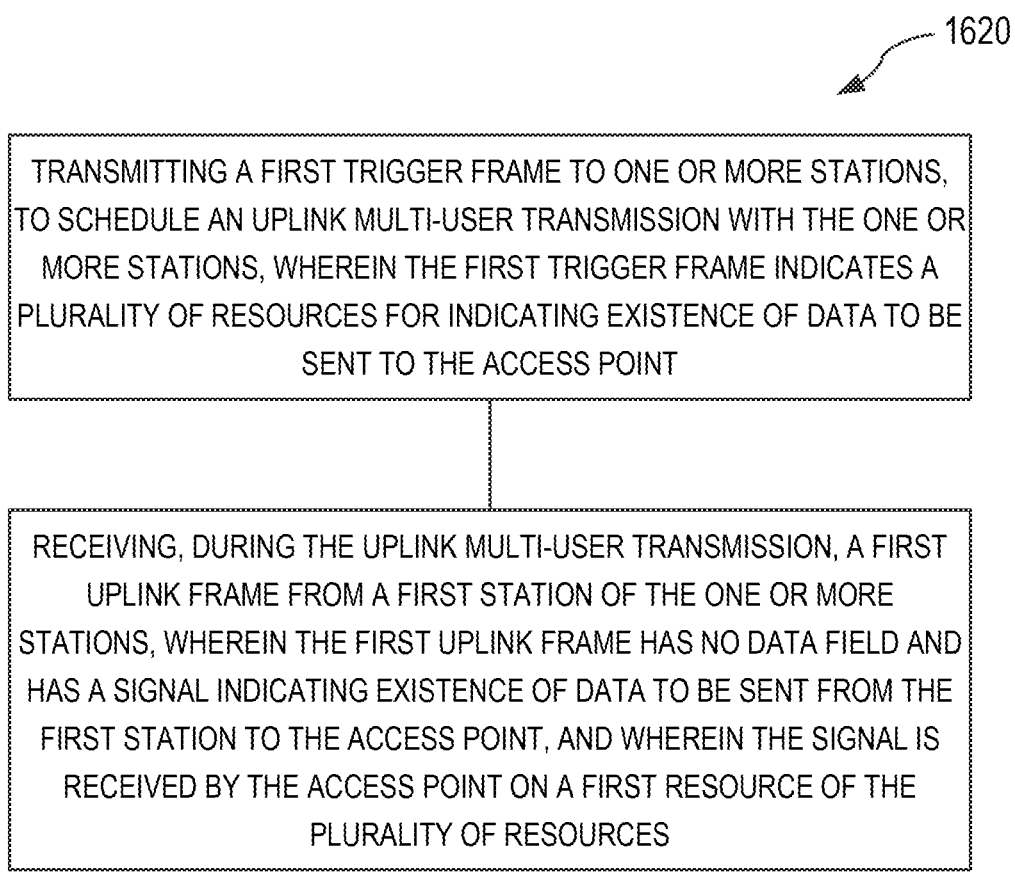

FIGS. 16A and 16B illustrate flow charts of examples of methods for facilitating wireless communication. For explanatory and illustration purposes, the example processes 1610 and 1620 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1610 and 1620 are not limited to the wireless communication devices 111-115 of FIG. 1 or their components, and the example processes 1610 and 1620 may be performed by some of the devices shown in FIG. 1, or other devices or components. Further for explanatory and illustration purposes, the blocks of the example processes 1610 and 1620 are described herein as occurring in serial or linearly. However, multiple blocks of the example processes 1610 and 1620 may occur in parallel. In addition, the blocks of the example processes 1610 and 1620 need not be performed in the order shown and/or one or more of the blocks/actions of the example processes 1610 and 1620 need not be performed.

Various examples of aspects of the disclosure are described below as clauses for convenience. These are provided as examples, and do not limit the subject technology. As an example, some of the clauses described below are illustrated in FIGS. 16A and 16B.

Clause A. A station for facilitating communication in a wireless network for multi-user transmission, the station comprising: one or more memories; and one or more processors coupled to the one or more memories, the one or more processors configured to cause: processing a first trigger frame received from an access point, wherein the first trigger frame schedules a first uplink multi-user transmission and indicates a plurality of resources for indicating existence of data to be sent to the access point; and transmitting, during the first uplink multi-user transmission to the access point and in response to the first trigger frame, a first uplink frame that has no data field and that has a signal indicating existence of data to be sent from the station to the access point, wherein the transmitting comprises transmitting the signal on a first resource of the plurality of resources.

Clause B. An access point for facilitating communication in a wireless network for multi-user transmission, the access point comprising: one or more memories; and one or more processors coupled to the one or more memories, the one or more processors configured to cause: transmitting a first trigger frame to one or more stations, to schedule an uplink multi-user transmission with the one or more stations, wherein the first trigger frame indicates a plurality of resources for indicating existence of data to be sent to the access point; and receiving, during the uplink multi-user transmission, a first uplink frame from a first station of the one or more stations, wherein the first uplink frame has no data field and has a signal indicating existence of data to be sent from the first station to the access point, and wherein the receiving comprises receiving the signal on a first resource of the plurality of resources.

Clause C. A computer-implemented method of facilitating communication in a wireless network for multi-user transmission, the method comprising: processing a first trigger frame received from an access point, wherein the first trigger frame is for scheduling a first uplink multi-user transmission and indicates a plurality of resources for indicating existence of data to be sent to the access point; and transmitting, during the first uplink multi-user transmission to the access point and in response to the first trigger frame, a first uplink frame that has no data field and that has a signal indicating existence of data to be sent from a station to the access point, wherein the signal is sent on a first resource of the plurality of resources.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A station for facilitating communication in a wireless network for multi-user transmission, the station comprising:
   one or more memories; and
   one or more processors coupled to the one or more memories, the one or more processors configured to cause:
   processing a first trigger frame received from an access point, wherein the first trigger frame schedules a first uplink multi-user transmission, including indicating allocation of a first set of resources for use in random access during the first uplink multi-user transmission, wherein the first set of resources are allocated for random access for a first set of stations of a first type; and
   transmitting, during the first uplink multi-user transmission to the access point and in response to the first trigger frame, a first uplink frame when the station is within the first set of stations, wherein the transmitting comprises transmitting the first uplink frame on a resource of the first set of resources.

2. The station of claim 1, wherein the first trigger frame indicates a second set of resources for random access, wherein the second set of resources are allocated for random access for a second set of stations of a second type.

3. The station of claim 1, wherein
   each resource in the first set of resources is associated with one or more of a frequency resource unit of a plurality of frequency resource units and a code of a plurality of codes,
   wherein the resource is associated with a frequency resource unit of the plurality of frequency resource units and a code of the plurality of codes,
   wherein each code of the plurality of codes is orthogonal to each of the other codes of the plurality of codes, and
   wherein the code spans a plurality of orthogonal frequency division multiplexing (OFDM) symbols of the first uplink frame.

4. The station of claim 3, wherein:
   the plurality of OFDM symbols include a plurality of high efficiency long training field (HE-LTF) symbols, and
   the first uplink frame includes the plurality of HE-LTF symbols, which occupy the frequency resource unit and to which the code is applied.

5. The station of claim 4, wherein the first trigger frame further comprises information on a number of the plurality of HE-LTF symbols to be included in the first uplink frame.

6. The station of claim 4, wherein the first uplink frame further comprises a Legacy Short Training Field (L-STF), a Legacy Long Training Field (L-LTF), a Legacy SIGNAL field (L-SIG), a High Efficiency SIGNAL A field (HE-SIG-A), and a High Efficiency Short Training Field (HE-STF).

7. The station of claim 3, wherein each code in the plurality of codes represents a spatial stream in a plurality of spatial streams.

8. The station of claim 7, wherein the plurality of codes corresponds to a plurality of rows in a matrix that represents the plurality of spatial streams.

9. The station of claim 1, wherein the first trigger frame requests a buffer status from stations in the first set of stations using random access and the first set of resources.

10. The station of claim 1, wherein transmitting the first uplink frame comprises:
    selecting the resource from the first set of resources; and
    generating the first uplink frame based on the selected resource.

11. The station of claim 10, wherein selecting the resource from the first set of resources comprises randomly selecting the resource among the first set of resources.

12. The station of claim 1, wherein the one or more processors are configured to cause:
    processing a second trigger frame received from the access point, wherein the second trigger frame comprises resource allocation information for scheduling a second uplink multi-user transmission, wherein the resource allocation information indicates a second set of resources for transmitting data to the access point; and transmitting, during the second uplink multi-user transmission to the access point, a second uplink frame based on the resource allocation information of the second trigger frame.

13. An access point for facilitating communication in a wireless network for multi-user transmission, the access point comprising:

one or more memories; and one or more processors coupled to the one or more memories, the one or more processors configured to cause:

transmitting a first trigger frame to a first plurality of stations, wherein the first trigger frame schedules a first uplink multi-user transmission, including indicating allocation of a first set of resources for use in random access during the first uplink multi-user transmission, wherein the first set of resources are allocated for random access for a first set of stations of a first type; and receiving, during the first uplink multi-user transmission, a first uplink frame from a first station when the first station is within the first set of stations, wherein the receiving comprises receiving the first uplink frame on a resource of the first set of resources.

14. The access point of claim 13, wherein the first trigger frame indicates a second set of resources for random access, wherein the second set of resources are allocated for random access for a second set of stations of a second type.

15. The access point of claim 13, wherein each resource in the first set of resources is associated with one or more of a frequency resource unit of a plurality of frequency resource units and a code of a plurality of codes, wherein the resource is associated with a frequency resource unit of the plurality of frequency resource units and a code of the plurality of codes, wherein each code of the plurality of codes is orthogonal to each of the other codes of the plurality of codes, and wherein the code spans a plurality of orthogonal frequency division multiplexing (OFDM) symbols of the first uplink frame.

16. The access point of claim 15, wherein:

the plurality of OFDM symbols include a plurality of high efficiency long training field (HE-LTF) symbols, and the first uplink frame includes the plurality of HE-LTF symbols, which occupy the frequency resource unit and to which the code is applied.

17. The access point of claim 16, wherein the first trigger frame further comprises information on a number of the plurality of HE-LTF symbols to be included in the first uplink frame.

18. The access point of claim 13, wherein the first trigger frame requests a buffer status from stations in the first set of stations using random access and the first set of resources.

19. The access point of claim 13, wherein the first uplink frame comprises a Legacy Short Training Field (L-STF), a Legacy Long Training Field (L-LTF), a Legacy SIGNAL field (L-SIG), a High Efficiency SIGNAL A field (HE-SIG-A), and a High Efficiency Short Training Field (HE-STF).

20. The access point of claim 13, wherein the one or more processors are configured to cause:

transmitting a second trigger frame to a second plurality of stations, wherein the second trigger frame comprises resource allocation information for scheduling a second uplink multi-user transmission, wherein the resource allocation information indicates a second set of resources for transmitting data to the access point; and receiving, during the second uplink multi-user transmission, a second uplink frame based on the resource allocation information of the second trigger frame.

* * * * *